June 12, 1923.  1,458,237
W. N. MUELLER
MILKING MACHINE
Filed April 22, 1922   2 Sheets-Sheet 1
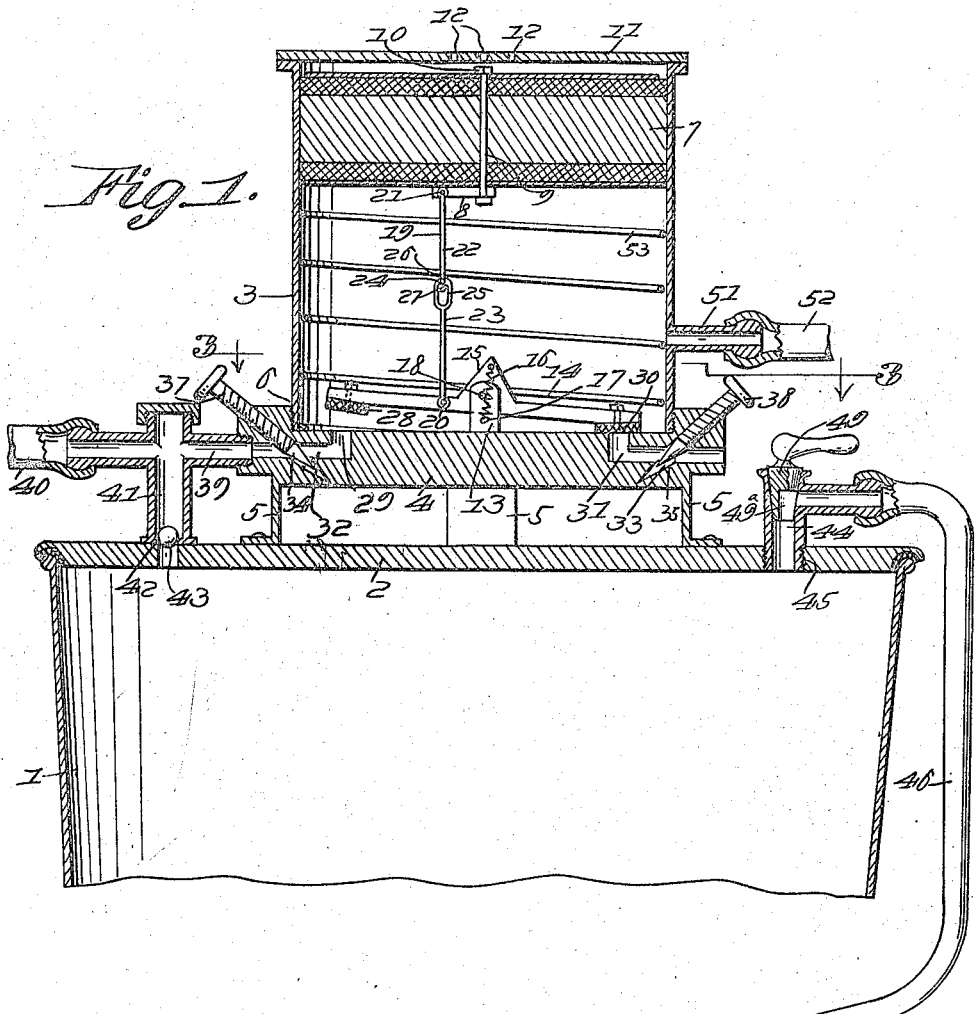
Fig. 1.
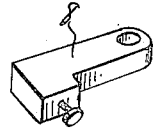
Fig. 4.
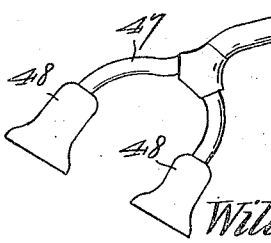
Inventor
William N. Mueller,
By Watson E. Coleman
Attorney June 12, 1923.  1,458,237
W. N. MUELLER
MILKING MACHINE
Filed April 22, 1922  2 Sheets-Sheet 2

Inventor
William N. Mueller,

By Watson E. Coleman
Attorney

Patented June 12, 1923.

1,458,237

UNITED STATES PATENT OFFICE.

WILLIAM N. MUELLER, OF FREDERICKSBURG, IOWA.

MILKING MACHINE.

Application filed April 22, 1922. Serial No. 555,986.

*To all whom it may concern:*

Be it known that I, WILLIAM N. MUELLER, a citizen of the United States, residing at Fredericksburg, in the county of Chickasaw and State of Iowa, have invented certain new and useful Improvements in Milking Machines, of which the following is a specification, reference being had to the accompanying drawings.

It is the purpose of the present invention to provide a machine of this character, wherein the construction is simple, efficient and practical, and involves improved features of construction, as will be pointed out in the following specification.

Another purpose is to provide a machine of this kind including a base (which constitutes the top of a milk pail or other receptacle), on which a cylinder is supported including a piston therein, whereby through the medium of vacuum and air valves and valve arm or lever carrying said valves and operatively connected to the piston, a pulsating action may be created in a tube for milking cows.

It is to be understood that the particulars herein given are in no way limitative and that while still keeping within the scope of the invention, any desired modifications of detail and desired proportions may be made in the apparatus according to circumstances.

The invention comprises further features and combination of parts, as will be hereinafter set forth, shown in the drawings and claimed.

In the drawings:—

Figure 1 is a vertical sectional view through the improved milking machine constructed in accordance with the invention, showing the valve arm tilted in a position for closing the air valve;

Figure 4 is a detail perspective view of a coupling block for coupling a connecting rod between the valve arm or lever and the piston;

Figure 2:
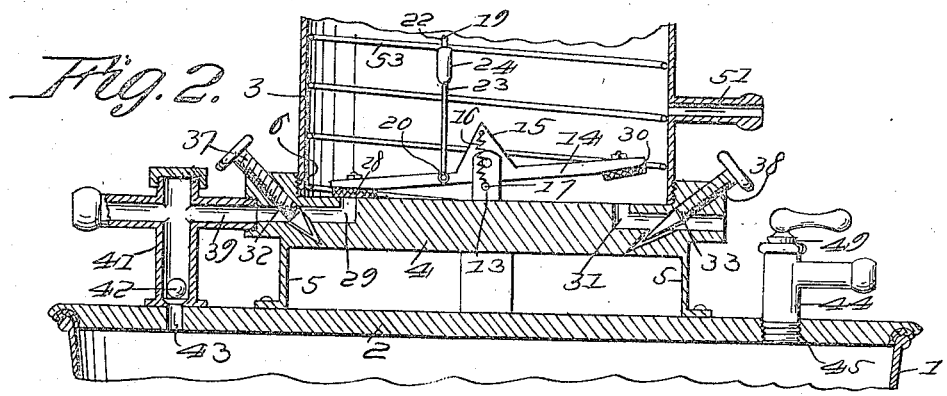
Figure 2 is a vertical sectional view through a fragmentary portion of the milking machine, showing the valve arm or lever tilted in the opposite direction for closing the vacuum valve.
Figure 3:
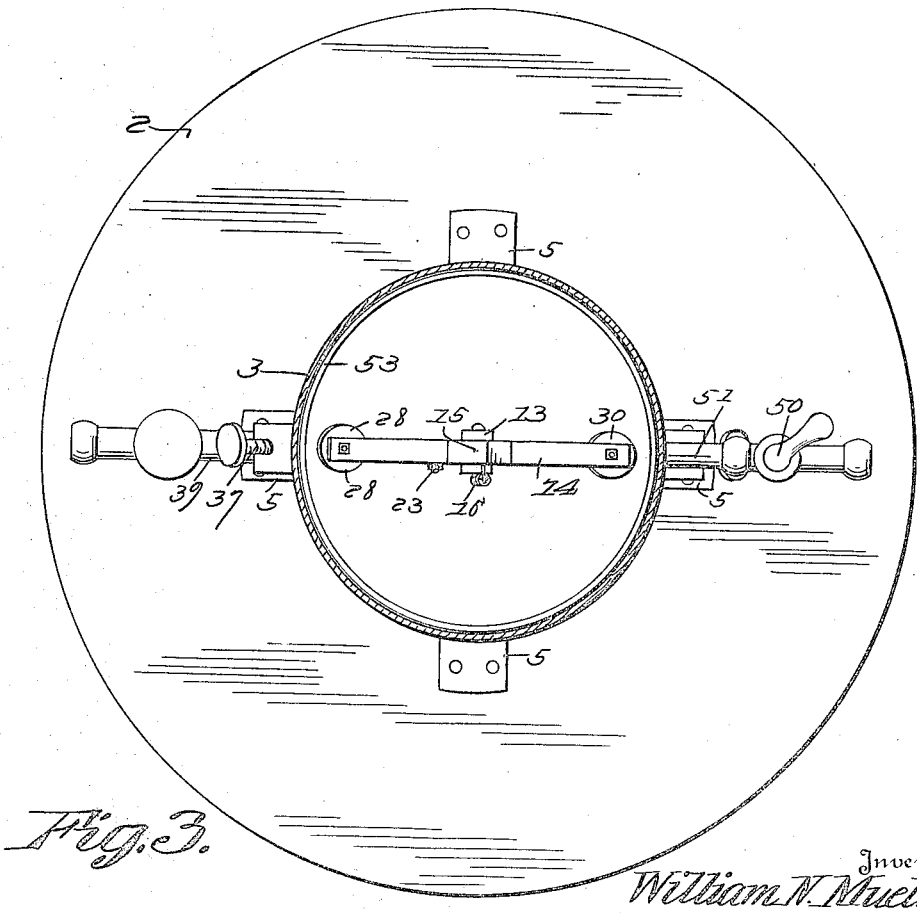
Figure 3 is a cross sectional view on line 3—3 of Figure 1.

Referring to the drawings, 1 designates a milk pail or other suitable receptacle, wherein the milk from the cow is adapted to flow, when a pulsating action is created on the interior thereof. Mounted upon the receptacle or pail is a cover or lid 2, which constitutes the base of the milking machine proper. In other words the milking machine comprises a cylinder 3, whose base 4 (which is relatively heavy and thick) is provided with supporting legs 5, which are secured in any suitable manner upon the lid or cover of the pail. The body of the cylinder is threaded to its base as shown at 6.

Mounted in the cylinder is a piston 7, to which a coupling block 8 is connected by means of a bolt 9 passing upwardly through the block and through the piston and is provided with securing means 10 so as to hold the bolt in place, and thereby connecting the coupling block in position on the bottom of the piston.

The top 11 of the cylinder is provided with a plurality of openings 12, through which air is drawn when the piston descends, and out of which the air is expelled when the piston ascends.

Mounted upon a suitable support or stud 13 (which rises from the bottom of the cylinder) is an oscillatory lever or arm 14. This lever 14 has an upstanding projection 15, to which a tension spring 16 is connected. The spring 16 is in turn connected at 17 to the upstanding post or stud. The construction and arrangement of the spring relatively to its connection with the projection 15 and the pivot of said lever are such that the spring is designed to contract on either side of the pivot 18 of the lever, so as to hold one end or the other of the lever depressed and its respective valve closed.

A rod connection 19 operatively connects one arm of the lever 14 and the coupling block 8 as at 20 and 21. This rod connection comprises two sections 22 and 23, the former is connected to the coupling block, and the latter to the lever. The two sections are operatively coupled by means of a sliding joint 24, which comprises the loop 25 which has a guide opening 26 for the section 22. The lower end of the section 22 has a head 27, which constitutes a hammer. In fact this sliding connection also constitutes a hammer joint, whereby when the piston 7 is drawn down due to the vacuum created in the cylinder, the head or hammer 27 imparts a hammer blow to the bottom of the loop, causing the arm, to which the section 23 is connected to tilt downwardly, and cause the valve 28 to close the port 29, as shown clearly in Figure 2.

When the piston 7 ascends, acting upon the rod connection, the arm carrying the valve 28 is raised, whereas the arm carrying the valve 30 is lowered, so that the valve 30 will act to close the port 31 of the base of the cylinder.

The ports 29 and 31 communicate with the passageways 32 and 33, which are provided with needle valve seats 34 and 35, with which the needle valves 37 and 38 cooperate, for the purpose of regulating the size of the passage adjacent said valve seats, in order to control the volume of air and suction. The passageway 33 communicates with the atmosphere, whereas the passageway 32 communicates with a pipe 39, to which a flexible tube 40 is connected. This tube 40 operatively connects with any conventional form of vacuum or suction pump (not shown), for creating a suction in the cylinder, and then in the pail. The pipe 39 communicatively connects with a cross connecting pipe 41 which rises from and is connected to the cover or base 2' of the milking apparatus. Where the pipe 41 joins the cover, a valve seat 42 is provided, and with which the conventional form of spherical or ball valve 43 cooperates, for controlling the suction action to be created in the pail or other receptacle.

A tubular elbow 44 is threaded in the cover or lid as at 45, and connected to the horizontal projecting arm of said elbow is a milking tube 46, which terminates in a plurality of branch tubes 47, which in turn are provided with teat engaging and receiving cups 48. A valve plug 49 is threaded at 50 in the upper end of the tubular elbow and is adapted for regulating the size of the communicating passages of the elbow, in order to govern the flow of the milk, and also the volume of the suction or vacuum to be created in the tube.

The cylinder 3 has a lateral extension tube 51, to which a flexible tube 52 (extending from any suitable air pump not shown) is connected.

A coiled expansion spring 53 is mounted in the cylinder and is adapted for assisting in raising the piston 7.

Upon suction being applied through the conduit 40 and assuming the mechanism to be in the position shown in Figure 1, pressure entering through the tube 51, suction will be created through the tube 39 sufficiently to overcome the incoming pressure from the tube 51 and cause the piston 7 to be drawn downwardly. This downward motion of the piston through the coaction of the loop 25 and head 27 will cause the lever 14 to be rocked in a direction to close the valve 28 and cut off the suction. This closing movement is completed by the spring 16 and the suction terminated by the closing of the valve. During this period the ball valve 43 remains seated and no suction is created within the receptacle 1 or in the teat engaging means 48. When, however, the valve 28 closes, the suction acts to lift ball 43 and a partial vacuum is created in the receptacle 1 and teat engaging means causing a flow of milk to the receptacle. The pressure entering at the tube 51 together with the action of the spring 53 is at this time acting to elevate the piston 7 and during its upward movement this piston causes engagement of the head 26 with the upper end of the loop 25 resulting in the valve 28 being drawn from its seat and the valve 30 being seated. In this case, the motion of the lever 14 is completed by the spring 16, as hereinbefore described. As the valve 30 seats, the vacuum again acts through the tube 39 and accordingly the ball valve 43 falls to its seat, cutting off the suction at the teat engaging means and discontinuing the flow. Action by the incoming compressed air at 51 to elevate the piston 7 is, of course, delayed by the port 31 through which a portion of the pressure may escape. It will be noted that since the size of this port may be regulated, the duration of the successive suction periods may be readily controlled and since the size of the port 32 is controllable through which the suction is created in the cylinder 3, the length of the period between suction periods may likewise be controlled. It will, of course, be obvious that by controlling the length of the suction periods and the rapidity with which they occur, the degree of partial vacuum within the receptacle 1 and teat engaging cups 48 may be varied to suit varying needs at will.

The invention having been set forth, what is claimed is:—

1. In a milking apparatus, a receptacle having a teat engaging means, means for creating a vacuum in said receptacle and the teat engaging means, means actuated by said vacuum creating means for retaining said vacuum, and pneumatic means operable upon the retaining means for terminating the period of vacuum created in said receptacle and the teat engaging means, and means for controlling the escape of air from the pneumatic means.

2. In a milking apparatus, a receptacle having a teat engaging means, means for creating a vacuum in said receptacle and the teat engaging means, means actuated by said vacuum creating means for retaining said vacuum, and pneumatic means operable upon the retaining means for terminating the period of vacuum created in said receptacle and the teat engaging means, and means controlling the amount of vacuum upon said retaining means, and means for controlling the escape of air from the pneumatic means.

3. In a milking apparatus, a receptacle provided with a teat engaging means, a cylinder mounted on the cover of the receptacle, suction means for creating a vacuum in the receptacle and the teat engaging means and operatively communicating the interior of the cylinder creating the vacuum therein, means in said cylinder actuated by the suction means for closing communication with the cylinder, thereby retaining the vacuum in the receptacle, and pneumatic means operable upon the retaining means to release it and thereby terminate the period of vacuum.

4. In a milking apparatus, a receptacle provided with a teat engaging means, a cylinder mounted on the cover of the receptacle, suction means for creating a vacuum in the receptacle and the teat engaging means and operatively communicating the interior of the cylinder creating the vacuum therein, means in said cylinder actuated by the suction means for closing communication with the cylinder, thereby retaining the vacuum in the receptacle, and pneumatic means operable upon the retaining means to release it and thereby terminate the period of vacuum, and means for permitting the escape of air from said pneumatic means.

5. In a milking apparatus, a receptacle provided with a teat engaging means, a cylinder mounted on the cover of the receptacle, suction means for creating a vacuum in the receptacle and the teat engaging means and operatively communicating the interior of the cylinder creating the vacuum therein, means in said cylinder actuated by the suction means for closing communication with the cylinder, thereby retaining the vacuum in the receptacle, and pneumatic means operable upon the retaining means to release it and thereby terminate the period of vacuum, and means for permitting the escape of air from said pneumatic means, and means for controlling the amount of suction created in said cylinder.

6. In a milking apparatus, a receptacle provided with a teat engaging means, a suction means for creating a vacuum in said receptacle, a cylinder provided with ports, one operatively connected with the suction means, the other communicating with the atmosphere, an oscillatory member operatively mounted in said cylinder and having valves cooperating with said ports, means mounted in the cylinder and provided with a hammer joint connection with said oscillatory member and being actuated by the suction means for tilting the oscillatory member for causing one valve of said member to close the port of communication with the suction means, thereby retaining the vacuum in the receptacle, whereby the other valve is disengaged from its port, and pneumatic means operatively connected with the cylinder to operate upon the oscillatory member actuating means to open the first port and close the second port for terminating the period of vacuum in the receptacle.

7. In a milking apparatus, a receptacle provided with a teat engaging means, a suction means for creating a vacuum in said receptacle, a cylinder provided with ports, one operatively connected with the suction means, the other communicating with the atmosphere, an oscillatory member operatively mounted in said cylinder and having valves cooperating with said ports, means mounted in the cylinder and provided with a hammer joint connection with said oscillatory member and being actuated by the suction means for tilting the oscillatory member for causing one valve of said member to close the port of communication with the suction means, thereby retaining the vacuum in the receptacle, whereby the other valve is disengaged from its port, and pneumatic means operatively connected with the cylinder to operate upon the oscillatory member actuating means to open the first port and close the second port for terminating the period of vacuum in the receptacle, and means for controlling the amount of suction created in said cylinder.

8. In a milking apparatus, a receptacle provided with a teat engaging means, a suction means for creating a vacuum in said receptacle, a cylinder provided with ports, one operatively connected with the suction means, the other communicating with the atmosphere, an oscillatory member operatively mounted in said cylinder and having valves cooperating with said ports, means mounted in the cylinder and provided with a hammer joint connection with said oscillatory member and being actuated by the suction means for tilting the oscillatory member for causing one valve of said member to close the port of communication with the suction means, thereby retaining the vacuum in the receptacle, whereby the other valve is disengaged from its port, and pneumatic means operatively connected with the cylinder to operate upon the oscillatory member actuating means to open the first port and close the second port for terminating the period of vacuum in the receptacle, and means operable across the second port for controlling the escape of air from the penumatic means.

9. In a milking apparatus, a receptacle provided with a teat engaging means, a suction means for creating a vacuum in said receptacle, a cylinder provided with ports, one operatively connected with the suction means, the other communicating with the atmosphere, an oscillatory member operatively mounted in said cylinder and having valves cooperating with said ports, means mounted in the cylinder and provided with a hammer joint connection with said oscillatory member and being actuated by the suction means for tilting the oscillatory member for causing one valve of said member to close the port of communication with the suction means, thereby retaining the vacuum in the receptacle, whereby the other valve is disengaged from its port, and pneumatic means operatively connecting with the cylinder to operate upon the oscillatory member actuating means to open the first port and close the second port for terminating the period of vacuum in the receptacle, and means for controlling the amount of suction created in said cylinder, and means operable across the second port for controlling the escape of air from the pneumatic means.

10. In a milking apparatus, a receptacle provided with a teat engaging means, a cylinder on the cover of said receptacle, suction means operatively communicating with the receptacle for creating a suction therein and in said teat engaging means, a passage and port communicating the suction means and said cylinder, said cylinder having a port communicating with the atmosphere, an oscillatory device in the cylinder and provided with valves to cooperate with the first and second ports, spring tensioned means in the cylinder and having a hammer connection with said oscillatory device for actuating said device and causing one valve to close the first port, thereby retaining the vacuum in said receptacle, pneumatic means operatively connected to the cylinder to permit the air to act upon the means which actuates said device to reverse the movement of said device and cause one valve to disengage from cooperation with the first port, and allow the other valve to close the second port.

11. In a milking apparatus, a receptacle provided with a teat engaging means, a cylinder on the cover of said receptacle, suction means operatively communicating with the receptacle for creating a suction therein and in said teat engaging means, a passage and port communicating the suction means and said cylinder, said cylinder having a port communicating with the atmosphere, an oscillatory device in the cylinder and provided with valves to cooperate with the first and second ports, spring tensioned means in the cylinder and having a hammer connection with said oscillatory device for actuating said device and causing one valve to close the first port, thereby retaining the vacuum in said receptacle, pneumatic means operatively connected to the cylinder to permit the air to act upon the means which actuates said device to reverse the movement of said device and cause one valve to disengage from cooperation with the first port, and allow the other valve to close the second port, means for controlling the suction action in said cylinder, and means in the second port for controlling the escape of air from the pneumatic means, prior to the closing of the second port.

In testimony whereof I hereunto affix my signature.

WILLIAM N. MUELLER.